US012288946B2

(12) United States Patent
Wang et al.

(10) Patent No.: US 12,288,946 B2
(45) Date of Patent: Apr. 29, 2025

(54) CONNECTOR ASSEMBLY

(71) Applicant: SHANGHAI·AEROSPACE·SCIENCE & INDUSTRY·APPLIANCE·CO., LTD, Shanghai (CN)

(72) Inventors: Xu Wang, Shanghai (CN); Tengfei Zeng, Shanghai (CN)

(73) Assignee: SHANGHAI·AEROSPACE·SCIENCE & INDUSTRY·APPLIANCE·CO., LTD, Shanghai (CN)

( * ) Notice: Subject to any disclaimer, the term of this patent is extended or adjusted under 35 U.S.C. 154(b) by 460 days.

(21) Appl. No.: 17/639,732

(22) PCT Filed: Feb. 17, 2020

(86) PCT No.: PCT/CN2020/075579
§ 371 (c)(1),
(2) Date: Mar. 2, 2022

(87) PCT Pub. No.: WO2021/042677
PCT Pub. Date: Mar. 11, 2021

(65) Prior Publication Data

US 2022/0329012 A1 Oct. 13, 2022

(30) Foreign Application Priority Data

Sep. 3, 2019 (CN) ......................... 201910828345.9

(51) Int. Cl.
*H01R 13/00* (2006.01)
*H01R 13/6471* (2011.01)
*H01R 13/6587* (2011.01)

(52) U.S. Cl.
CPC ..... *H01R 13/6471* (2013.01); *H01R 13/6587* (2013.01)

(58) Field of Classification Search
CPC ........................ H01R 13/6471; H01R 13/6587
See application file for complete search history.

(56) References Cited

U.S. PATENT DOCUMENTS 9,257,778 B2 * 2/2016 Buck .................. H01R 12/7005
2012/0214343 A1 8/2012 Buck et al.
(Continued)

FOREIGN PATENT DOCUMENTS

CN 101960674 A 1/2011
CN 204809560 U 11/2015
(Continued)

OTHER PUBLICATIONS

International Search Report dated Jun. 4, 2020 issued in corresponding parent Application No. PCT/CN2020/075579,v/English Translation (7 pages).
(Continued)

*Primary Examiner* — Phuong Chi Thi Nguyen
(74) *Attorney, Agent, or Firm* — GREENBLUM & BERNSTEIN, P.L.C.

(57) ABSTRACT

Disclosed is a connector assembly. The connector assembly comprises a first connector and a second connector, wherein the first connector comprises a first base body, a first ground terminal and a first shielding piece, the first ground terminal and the first shielding piece are both arranged on the first base body, and the first ground terminal is electrically connected to the first shielding piece; and the second connector comprises a second base body, a second ground terminal and a second shielding piece, the second ground terminal and the second shielding piece are both arranged on the second base body, the second ground terminal is electrically connected to the second shielding piece, and the second ground terminal is electrically connected to the first ground terminal.

17 Claims, 11 Drawing Sheets

(56) References Cited

U.S. PATENT DOCUMENTS

| | | | |
|---|---|---|---|
| 2012/0214344 | A1 | 8/2012 | Cohen et al. |
| 2015/0079819 | A1 | 3/2015 | Tamai |
| 2017/0358885 | A1 | 12/2017 | Okuyama et al. |

FOREIGN PATENT DOCUMENTS

| | | | |
|---|---|---|---|
| CN | 106299887 | A | 1/2017 |
| CN | 206225679 | U | 6/2017 |
| CN | 108461993 | A | 8/2018 |
| CN | 109659725 | A | 4/2019 |
| CN | 110571597 | A | 12/2019 |
| CN | 210296769 | U | 4/2020 |
| EP | 1 770 584 | A1 | 8/2014 |
| KR | 10-2015-0119616 | A | 10/2015 |

OTHER PUBLICATIONS

Written Opinion dated Jun. 4, 2020 issued in corresponding parent Application No. PCT/CN2020/075579 w/English translation (8 pages).
Extended European Search Report for corresponding EP Application No. 20860416.5 issued Jul. 31, 2023 (8 pages).
First Office Action in related Chinese Application No. 201910828345.9, dated Jan. 9, 2024, 13 pages.

* cited by examiner

CONNECTOR ASSEMBLY

CROSS REFERENCE TO RELATED APPLICATIONS

This application is a National Phase of International Application No. PCT/CN2020/075579 filed on Feb. 17, 2020, which claims priority to Chinese Patent Application No. 201910828345.9, entitled "CONNECTOR ASSEMBLY" and filed with the China National Intellectual Property Administration on Sep. 3, 2019, which is incorporated herein by reference in their entireties.

TECHNICAL FIELD

The present disclosure relates to the technical field of electronic products, and in particular, to a connector assembly.

BACKGROUND

A connector assembly includes a male connector and a female connector mated with each other. For a conventional connector assembly, in a mating region of the male connector and the female connector, a ground terminal of the male connector is electrically connected to a ground terminal of the female connector, a signal terminal of the male connector is electrically connected to a signal terminal of the female connector, and a shielding piece of the male connector is electrically connected to a shielding piece of the female connector.

The crosstalk of adjacent two pairs of differential signals of the conventional connector assembly and the resonance caused by the signal transmission are relatively large, especially for a board-to-board connector assembly, resulting in relatively small bandwidth for signal transmission of the connector assembly.

SUMMARY

According to various embodiments of present disclosure, a connector assembly is provided.

The connector assembly includes:

a first connector, wherein the first connector comprises a first substrate, a first ground terminal, and a first shielding piece, the first ground terminal and the first shielding piece are disposed on the first substrate, and the first ground terminal is electrically connected to the first shielding piece; and a second connector, wherein the second connector comprises a second substrate, a second ground terminal, and a second shielding piece, the second ground terminal and the second shielding piece are disposed on the second substrate, the second ground terminal is electrically connected to the second shielding piece, and the second ground terminal is electrically connected to the first ground terminal.

Details of one or more embodiments of this application are provided in the drawings and descriptions below. Other features, objectives, and advantages of this application become apparent from the specification, the drawings, and the claims.

BRIEF DESCRIPTION OF THE DRAWINGS

To better describe and illustrate embodiments and/or examples of the disclosure herein, reference may be made to one or more of the drawings. Additional details or examples used for describing the drawings are not to be considered as limiting the scope of any of the disclosure, currently described embodiments and/or examples, and the best modes of the present invention currently understood.

DETAILED DESCRIPTION OF THE EMBODIMENTS

Figure 1:
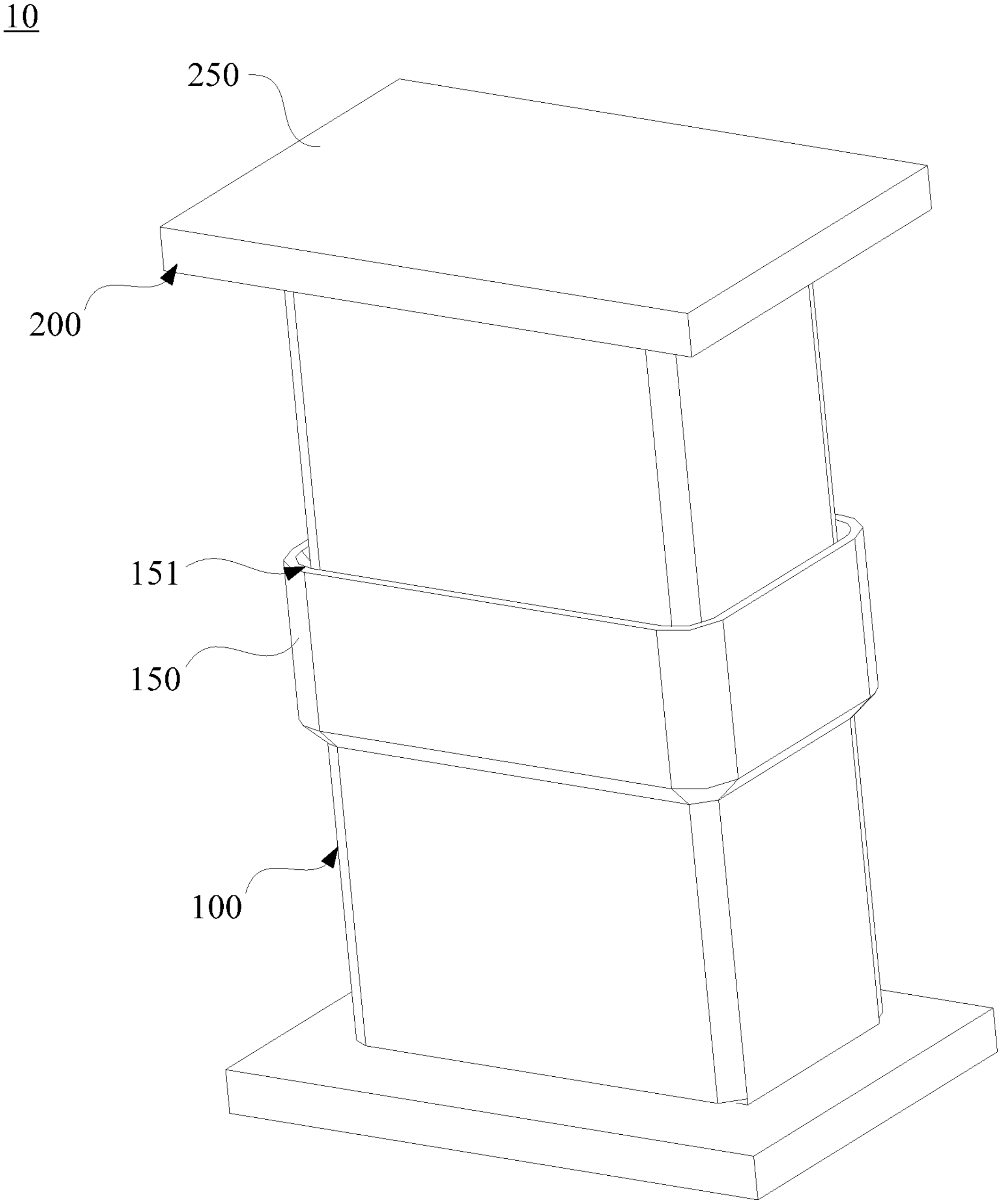
FIG. 1 is a schematic view of a connector assembly according to an embodiment.

For ease of understanding this application, this application is described more comprehensively below with reference to the drawings. Exemplary embodiments of this application are provided in the drawings. However, this application may be implemented in many different forms, and is not limited to the embodiments described in this specification. On the contrary, the embodiments are provided to make understanding of the disclosed content of this application more comprehensive and thorough.

It should be noted that, when a component is referred to as "being fixed to" another component, the component may be directly on the other component, or an intervening component may be present. When a component is considered to be "connected to" another component, the component may be directly connected to another component, or an intervening component may also be present.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

In an embodiment, a connector assembly includes a first connector and a second connector. The first connector includes a first substrate, a first ground terminal, and a first shielding piece. The first ground terminal and the first shielding piece are disposed on the first substrate, and the first ground terminal is electrically connected to the first shielding piece. The second connector includes a second substrate, a second ground terminal, and a second shielding piece. The second ground terminal and the second shielding piece are disposed on the second substrate, and the second ground terminal is electrically connected to the second shielding piece. The second ground terminal is electrically connected to the first ground terminal.

Figure 2:
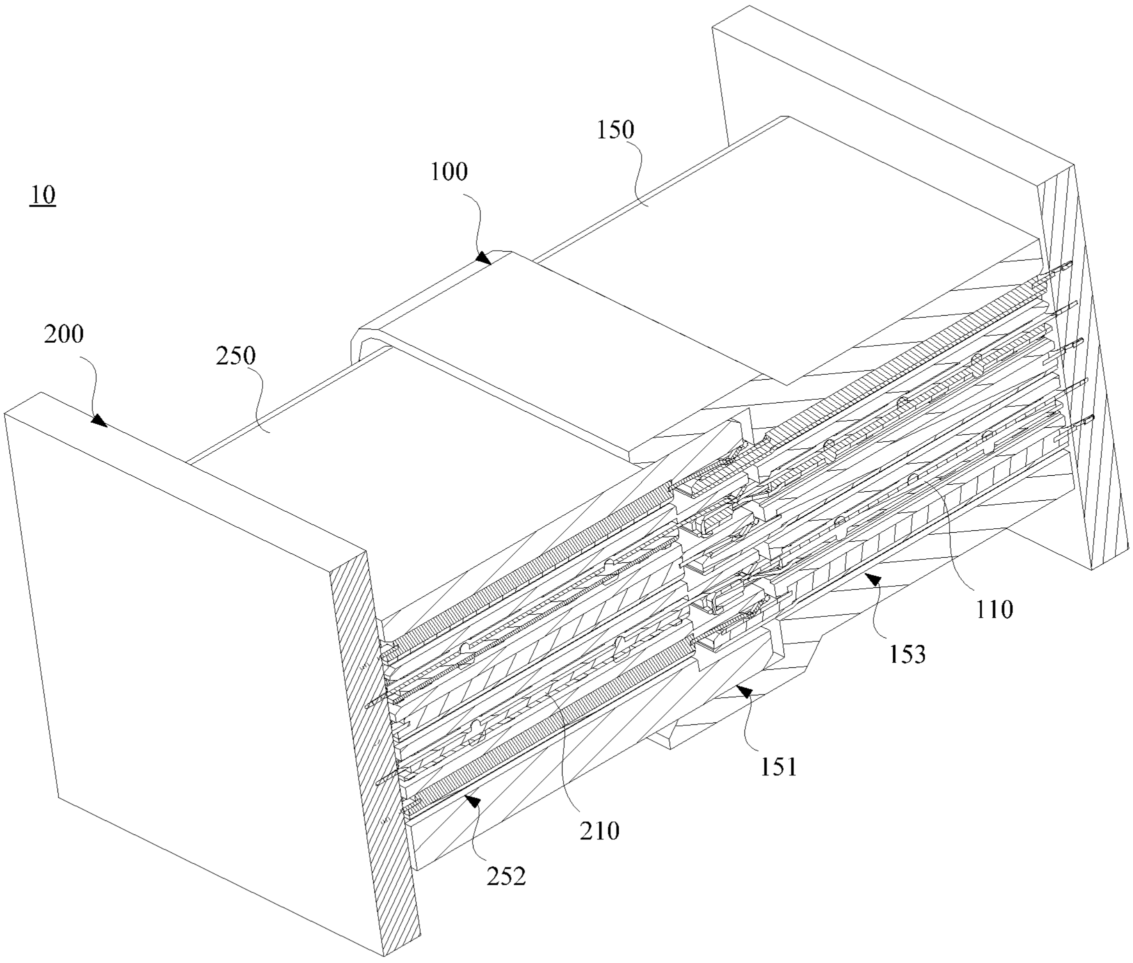
FIG. 2 is a cross-sectional view of a connector assembly shown in FIG. 1.
Figure 3:
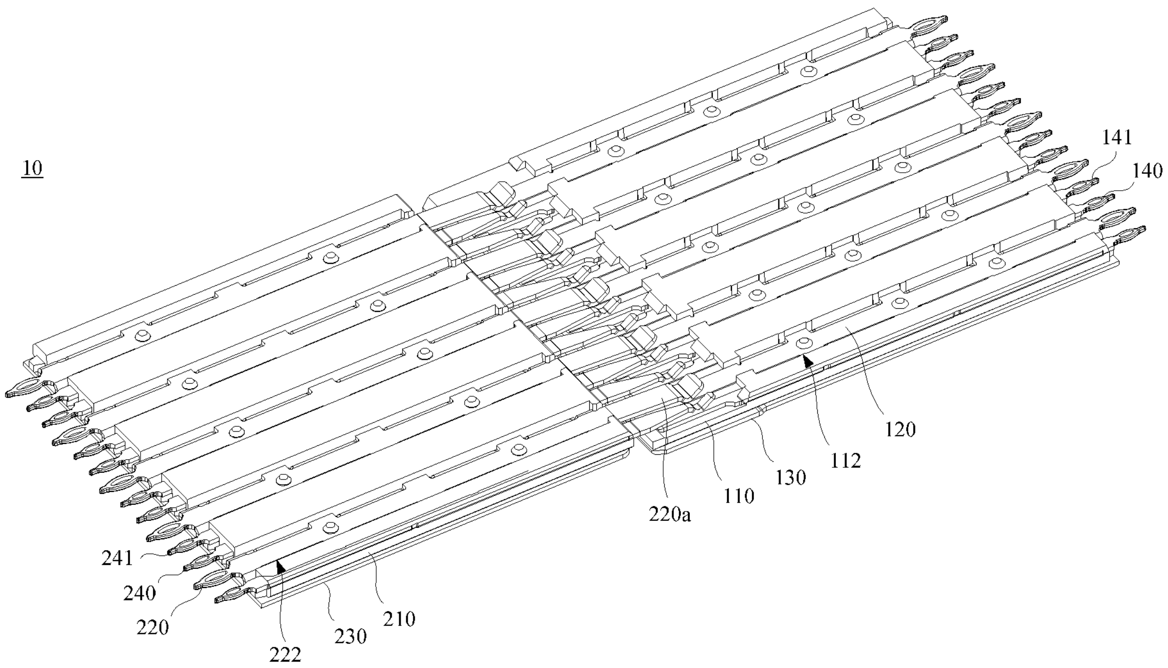
FIG. 3 is a partial schematic view of a connector assembly shown in FIG. 1.
Figure 4:
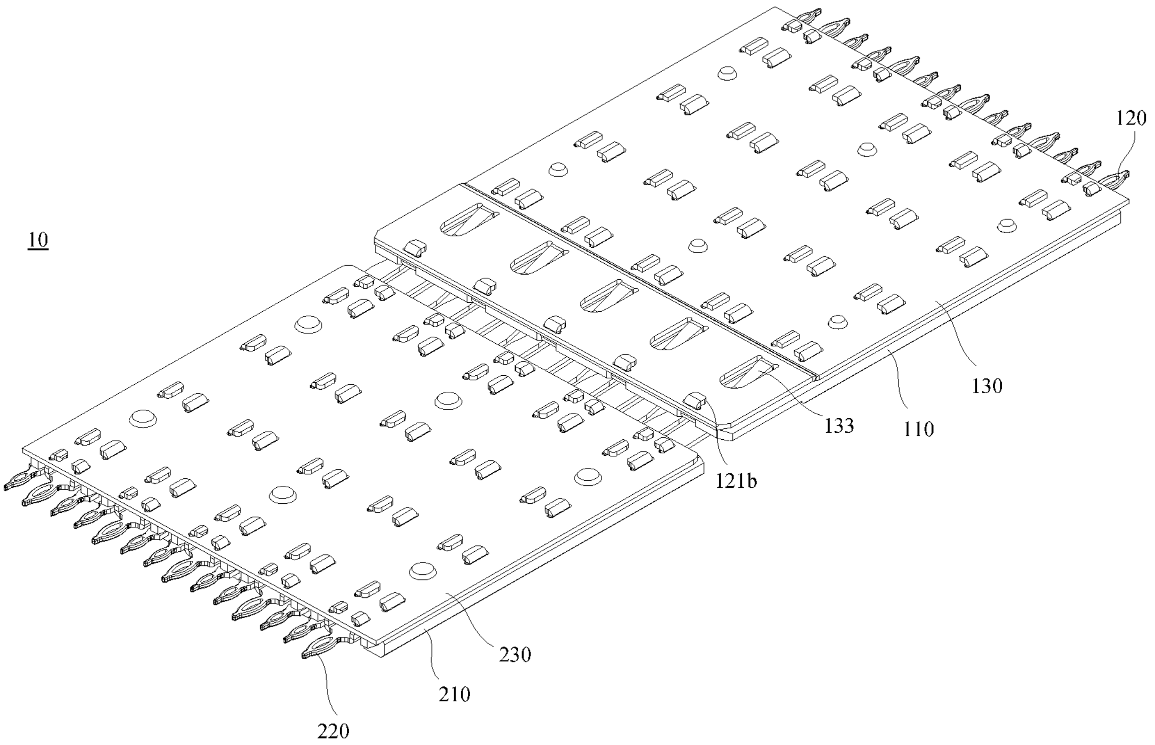
FIG. 4 is a schematic view of a connector assembly shown in FIG. 3 from another perspective.
Figure 5:
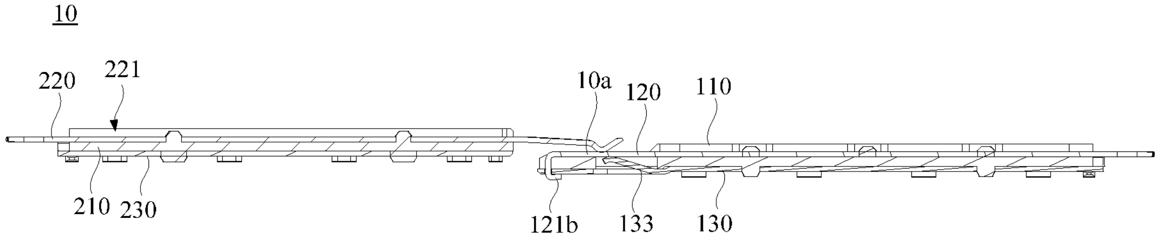
FIG. 5 is a cross-sectional view of a connector assembly shown in FIG. 4.

As shown in FIG. 1 to FIG. 3, a connector assembly 10 of an embodiment includes a first connector 100 and a second connector 200. In this embodiment, the connector assembly is a board-to-board connector assembly. As shown in FIG. 4 and FIG. 5, the first connector 100 is a male connector, and the second connector 200 is a female connector. It should be understood that, in another embodiment, the first connector may be a female connector, and correspondingly, the second connector may be a male connector.

Figure 6:
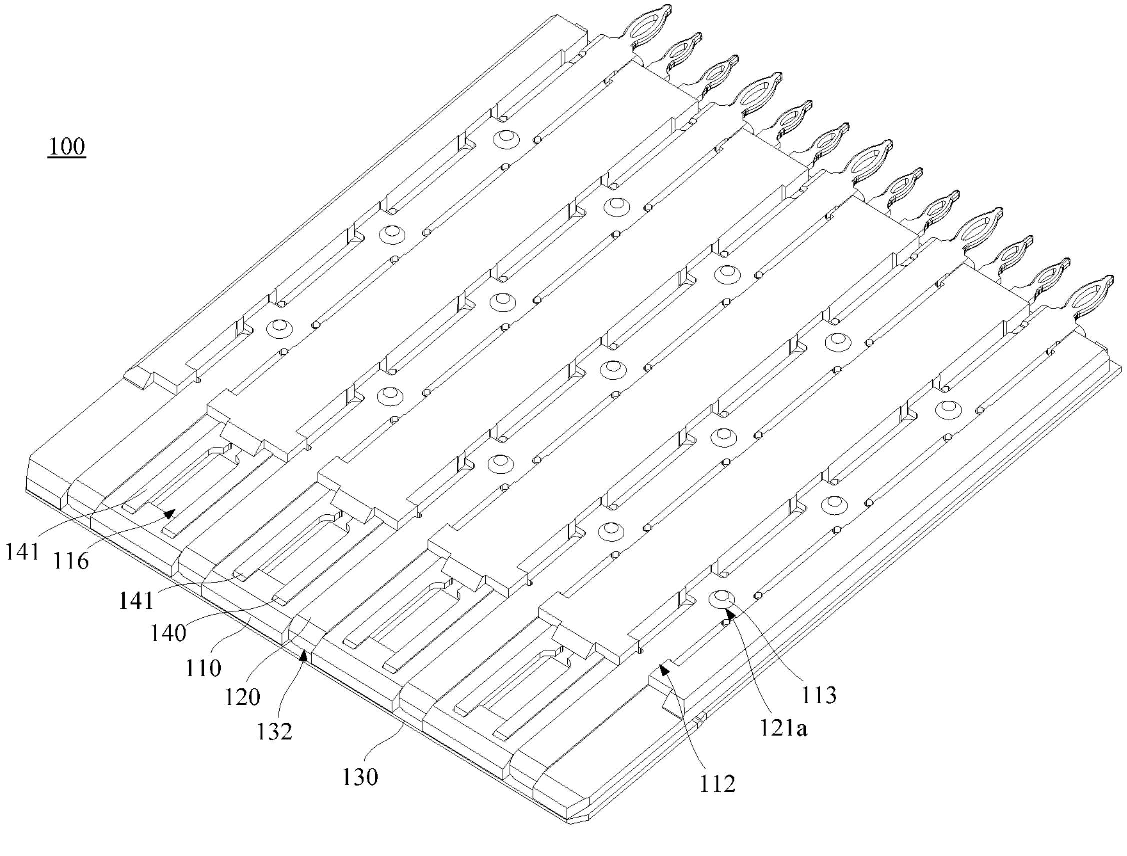
FIG. 6 is a schematic view of a first connector of a connector assembly shown in FIG. 4.
Figure 7:
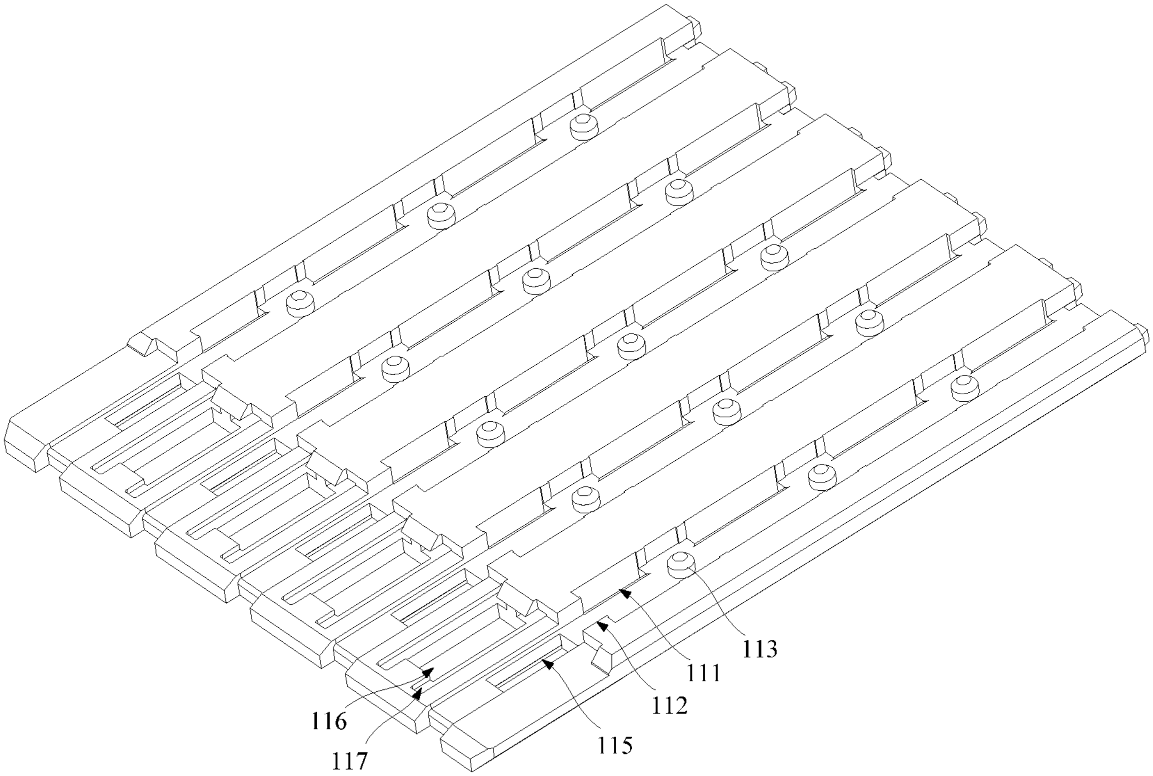
FIG. 7 is a partial schematic view of a first connector shown in FIG. 6.
Figure 8:
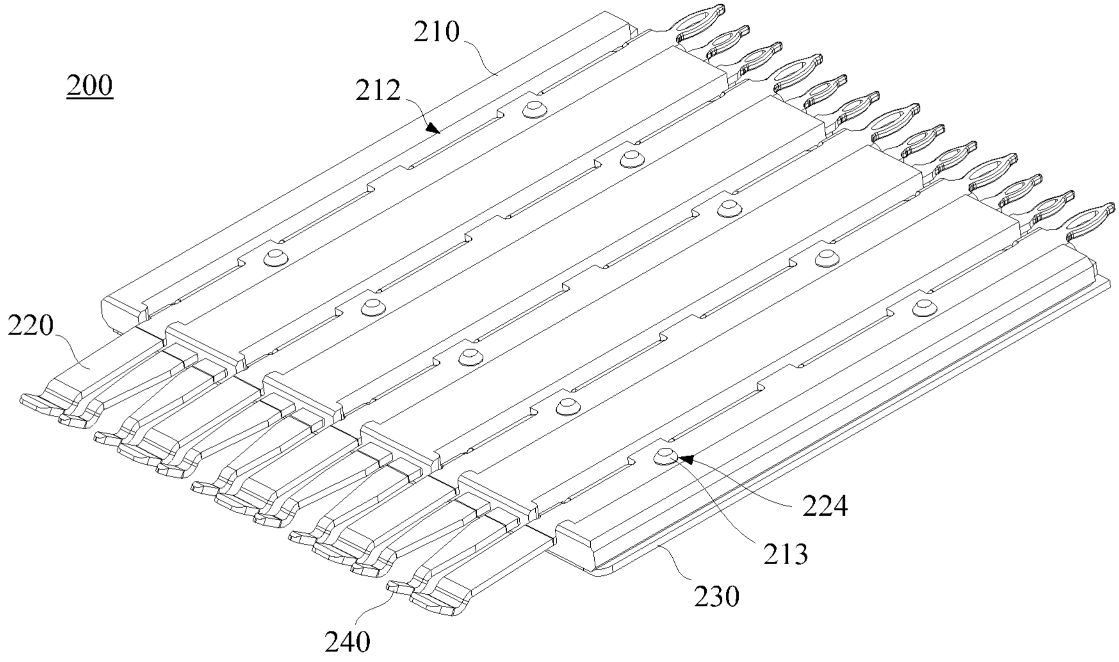
FIG. 8 is a schematic view of a second connector of a connector assembly shown in FIG. 4.

As shown in FIG. 6 and FIG. 7, in one of the embodiments, the first connector includes a first substrate 110, a first ground terminal 120, and a first shielding piece 130. The first ground terminal and the first shielding piece are disposed on the first substrate, and the first ground terminal is electrically connected to the first shielding piece, so that a ground signal of the first ground terminal can be electrically connected to the first shielding piece. As shown in FIG. 8, in one of the embodiments, the second connector includes a second substrate 210, a second ground terminal 220, and a second shielding piece 230. The second ground terminal and the second shielding piece are disposed on the second substrate, and the second ground terminal is electrically connected to the second shielding piece, so that a ground signal of the second ground terminal can be electrically connected to the second shielding piece. The second ground terminal is electrically connected to the first ground terminal, so that a ground signal of the first ground terminal can not only be transmitted to a ground terminal of the second connector, but also to a first shield terminal.

In the connector assembly above, since the first ground terminal of the first connector is electrically connected to the first shielding piece, the ground signal of the first connector can be connected to the first shielding piece. Since the second ground terminal of the second connector is electrically connected to the second shielding piece, the ground signal of the second connector can be connected to the second shielding piece. Furthermore, since the second ground terminal is electrically connected to the first ground terminal, the ground signal of the first connector is connected to the ground signal of the second connector. In addition, ground signals of the first connector and the second connector are connected to corresponding shielding pieces. Therefore, the crosstalk of the adjacent two pairs of differential signals of the connector assembly and the resonance caused by the signal transmission are greatly reduced, and the problem of the small bandwidth for signal transmission of the connector assembly is resolved.

As shown in FIG. 5, in this embodiment, in a mating region 10*a* of the first connector and the second connector, the first ground terminal elastically abuts against the second ground terminal, so that the first ground terminal is electrically connected to the second ground terminal. In this embodiment, the mating region is a region in which the first connector and the second connector of the connector assembly are mated with each other, that is, a region in which the first ground terminal is mated with the second ground terminal, and in which the first signal terminal is mated with the second signal terminal.

As shown in FIG. 3, in one of the embodiments, an abutting elastic piece 220*a* in a bent shape is formed on one end of the second ground terminal adjacent to the first ground terminal, and the abutting elastic piece abuts against the first ground terminal, so that the first ground terminal elastically abuts against the second ground terminal. In one of the embodiments, a bending portion of the abutting elastic piece forms an abutting protrusion protruding toward the first ground terminal, and the abutting protrusion abuts against the first ground terminal, so that the abutting elastic piece abuts against the first ground terminal, and the abutting elastic piece has better elastic stiffness.

As shown in FIG. 3, in one of the embodiments, the first connector further includes a first signal terminal 140, and the first signal terminal is wrapped in the first substrate. In one of the embodiments, the second connector further includes a second signal terminal 240, the second signal terminal is wrapped in the second substrate, and the second signal terminal abuts against the first signal terminal, so that the first signal terminal is electrically connected to the second signal terminal.

In one of the embodiments, the first signal terminal and the first substrate are integrally formed, so that the structure of the first connector is relatively compact. In this embodiment, the first substrate is made of plastic. The first ground terminal is assembled on the first substrate through secondary assembly, so that the first ground terminal is connected to the first substrate. In one of the embodiments, the second signal terminal and the second substrate are integrally formed, so that the structure of the second connector is relatively compact. In this embodiment, the second substrate is made of plastic. The second ground terminal is assembled on the second substrate through secondary assembly, so that the second ground terminal is connected to the second substrate.

As shown in FIG. 3, in one of the embodiments, the first signal terminal includes two first signal terminal units 141, and the two first signal terminal units are disposed in parallel. Each first signal terminal unit is disposed in parallel with the first ground terminal. In one of the embodiments, the second signal terminal includes two second signal terminal units 241, and the two second signal terminal units are disposed in parallel. Each second signal terminal unit is disposed in parallel with the second ground terminal. The each first signal terminal unit abuts against a corresponding second signal terminal unit, so that the each first signal terminal unit is electrically connected to the corresponding second signal terminal unit. In this way, the first signal terminal and the second signal terminal can transmit differential signals.

In this embodiment, a number of the first signal terminal and a number of the second signal terminal are both at least two, and each first signal terminal is electrically connected to a corresponding second signal terminal. A first ground terminal exists between every adjacent two first signal terminals, and a second ground terminal exists between every adjacent two second signal terminals, so that the crosstalk between adjacent two pairs of differential signals is reduced.

As shown in FIG. 2, in one of the embodiments, the first connector further includes a first housing 150, the first housing defines a slot 151 and a first accommodating groove 153 in communication with each other. The first substrate, the first ground terminal, the first signal terminal, and the first shielding piece are all located in a first accommodating cavity. The second connector further includes a second housing 250, and the second housing is partially located in the slot and slidably connected to the first housing. The second housing defines a second accommodating cavity 252 in communication with the first accommodating cavity, and the second ground terminal, the second signal terminal, and the second shielding piece are all located in the second accommodating cavity, so that the first connector is better mated with the second connector.

As shown in FIG. 6 and FIG. 7, in one of the embodiments, the first substrate defines a first through hole 111. Further referring to FIG. 9, the first ground terminal includes a first terminal body 121 and a first inserting portion 123 connected to each other, and the first terminal body and the first shielding piece are located on both sides of the first substrate, respectively. The first inserting portion extends through the first through hole and is in contact with the first shielding piece, so that the ground signal of the first terminal body is transmitted to the first shielding piece through the first inserting portion. Therefore, the first ground terminal is electrically connected to the first shielding piece. In this embodiment, the first terminal body is located on one side of the first substrate away from the first shielding piece, so that the first terminal body is spaced apart from the first shielding piece. In addition, a distance between the first terminal body and the first shielding piece is relatively large, thus increasing the impedance of the first connector.

Figure 10:
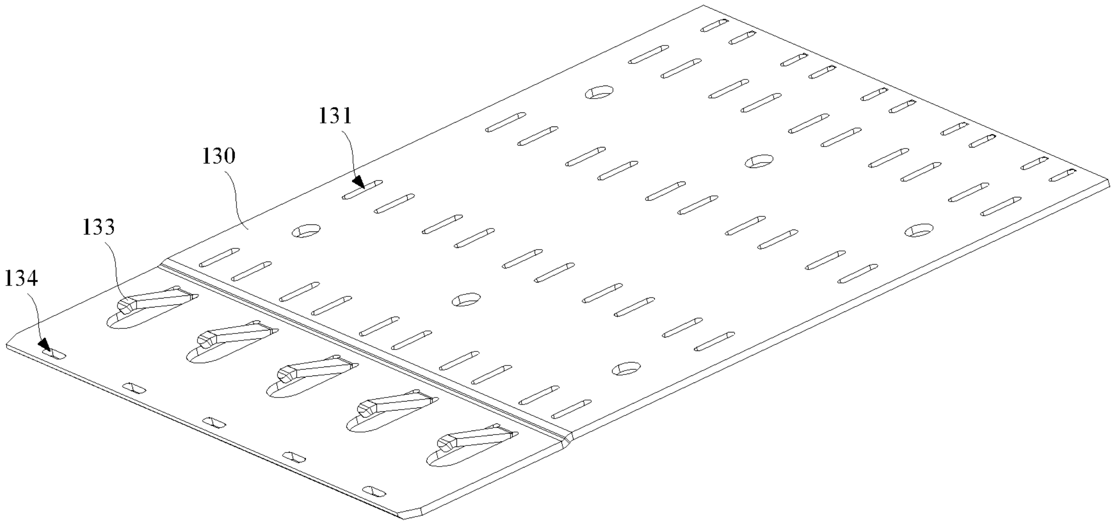
FIG. 10 is a schematic view of a first shielding piece of a first connector shown in FIG. 6.

As shown in FIG. 10, in order to make the first inserting portion be electrically connected to the first shielding piece reliably, in one of the embodiments, the first shielding piece defines a first connection hole 131, and the first inserting portion is partially located in the first connection hole and abuts against the first shielding piece, so that a contact area between the first inserting portion and the first shielding piece is relatively large. Therefore, the first inserting portion is electrically connected to the first shielding piece reliably.

In one of the embodiments, the first inserting portion is in a bent shape, so that the first inserting portion better abuts against the first shielding piece. In one of the embodiments, one end of the first inserting portion away from the first terminal body abuts against one side of the first shielding piece away from the first substrate. That is, the end of the first inserting portion away from the first terminal body is folded back and abuts against the side of the first shielding piece away from the first substrate, so that the first ground terminal fixes and combines the first shielding piece and the first substrate together. Therefore, not only the reliability of the connection between the first shielding piece and the first substrate is improved, but also the contact area between the first inserting portion and the first shielding piece is relatively large, so that the first inserting portion is electrically connected to the first shielding piece more reliably. In this embodiment, the first inserting portion is a bent piece with an L-shaped cross-section. The first inserting portion is vertically connected to the first terminal body.

Figure 9:
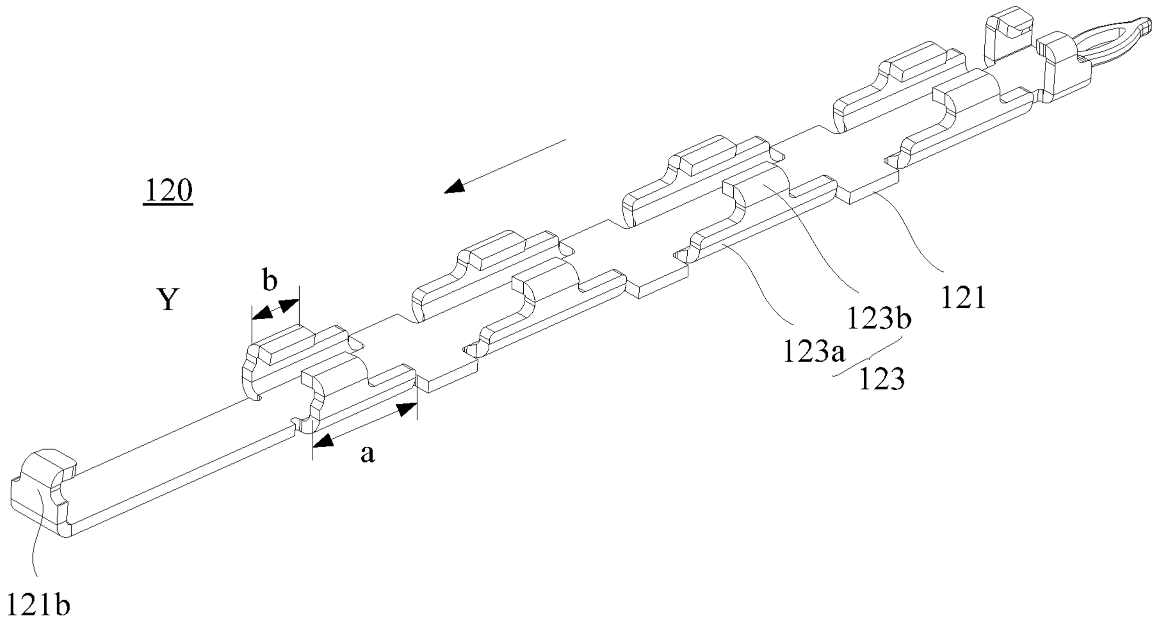
FIG. 9 is a schematic view of a first ground terminal of a first connector shown in FIG. 6.

As shown in FIG. 9, in one of the embodiments, the first inserting portion includes a first connection portion **123*a* and a first inserting portion main body 123*b*** connected to each other, and the first connection portion is connected to the first terminal body, so that the first inserting portion is connected to the first terminal body. In this embodiment, the first inserting portion main body is in a bent shape. In one of the embodiments, a width of the first connection portion in a direction parallel to an extending direction of the first terminal body is a first width a. That is, the width of the first connection portion in a direction parallel to a plane where the extending direction of the first terminal body lies is the first width. A width of the first inserting portion main body in a direction parallel to the extending direction of the first terminal body is a second width b. That is, the width of the first inserting portion main body in a direction parallel to the plane where the extending direction of the first terminal body lies is the second width, and the first width is greater than the second width, so that the ground signal of the first terminal body can be quickly transmitted to the first inserting portion main body through the first connection portion. Therefore, the first ground terminal is better electrically connected to the first shielding piece. In one of the embodiments, a width of the first through hole in a direction parallel to the extending direction of the first terminal body is equal to the first width, and the first connection portion extends through the first through hole. A width of the first connection hole in a direction parallel to the extending direction of the first terminal body is equal to the second width, and the first inserting portion main body extends through the first connection hole, so that the first connection portion is limited to one side of the first shielding piece. Therefore, a distance between the first terminal body and the first shielding piece is relatively precise.

As shown in FIG. 6 and FIG. 7, in one of the embodiments, a side of the first substrate away from the first shielding piece defines a first positioning groove 112 in communication with the first through hole, and the first terminal body is located in the first positioning groove and is connected to the first substrate, so that the first ground terminal is connected to the first substrate. Further, a first boss 113 is formed on the side of the first substrate away from the first shielding piece, and the first boss is located in the first positioning groove. The first terminal body defines a first positioning hole **121*a*** matching with the first boss, thus avoiding the problem that the first terminal body is loose from the first substrate, so that the first ground terminal is better positioned and connected to the first substrate. Therefore, the first ground terminal is fastened and fixed to the first substrate.

Figure 11:
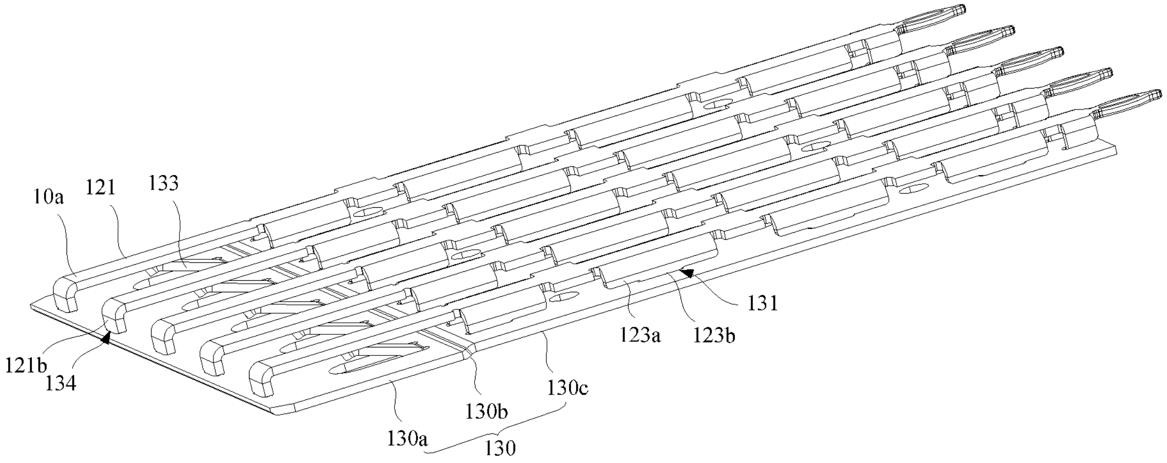
FIG. 11 is a partial schematic view of a first connector shown in FIG. 6.

As shown in FIG. 9, in one of the embodiments, the first ground terminal further includes a bending hook **121*b* connected to the first terminal body, and the hook is disposed adjacent to the second ground terminal. As shown in FIG. 10 and FIG. 11, the first shielding piece defines a via hole 134**, the hook extends through the via hole, and one end of the hook away from the first terminal body abuts against the first shielding piece, so that the first terminal body is electrically connected to the first shielding piece. Therefore, the crosstalk between the adjacent two pairs of differential signals and the resonance caused by the signal transmission are further reduced. That is, the loop inductance of the signal transmission of the connector assembly is reduced, so that the bandwidth for signal transmission of the connector assembly is expanded. In this embodiment, the hook abuts against one end of the first substrate adjacent to the second substrate, and extends through the via hole to press the first shielding piece on the first substrate, so that the first shielding piece is firmly connected to the first substrate.

In one of the embodiments, a number of the first through hole is at least two. A number of the first inserting portion is at least two, and each first inserting portion is partially located in a corresponding first through hole, so that the connection between the first shielding piece and the first substrate is stronger, and the electrical connection between the first ground terminal and the first shielding piece is more reliable.

In one of the embodiments, a number of the first through hole and a number of the first inserting portion are both 2N. 2N first inserting portions are symmetrically distributed on both sides of an extending direction of the first terminal body, and bending directions of any two of the first inserting portions symmetrically disposed with respect to the extending direction of the first terminal body are opposite, so that the first ground terminal better fixes and combines the first shielding piece and the first substrate together. Therefore, the connection between the first shielding piece and the first substrate is stronger, and the electrical connection between the first ground terminal and the first shielding piece is more reliable. N is greater than or equal to 1, and N is an integer. In this embodiment, a plane where a bending direction of the each first inserting portion lies is a cross-section of the first terminal body. The extending direction of the first terminal body is perpendicular to the plane where the bending direction of the each first inserting portion lies, for example, an arrow Y direction as shown in FIG. 9. That is to say, the extending direction of the first terminal body as described herein is perpendicular to the cross-section of the first terminal body. The extending direction of the first terminal body is parallel to a surface of the first substrate.

In an embodiment, two first inserting portions that are symmetrically disposed on the first terminal body along the extending direction of the first terminal body form a pair of first inserting portions. As such, the 2N first inserting portions form N pairs of first inserting portions, bending directions of each pair of first inserting portions are opposite, and planes where the bending directions of the each pair of first inserting portions lie are coplanar, so that the first ground terminal better fixes and combines the first shielding piece and the first substrate together. Therefore, the connection between the first shielding piece and the first substrate is stronger, and the electrical connection between the first ground terminal and the first shielding piece is more reliable.

Figure 12:
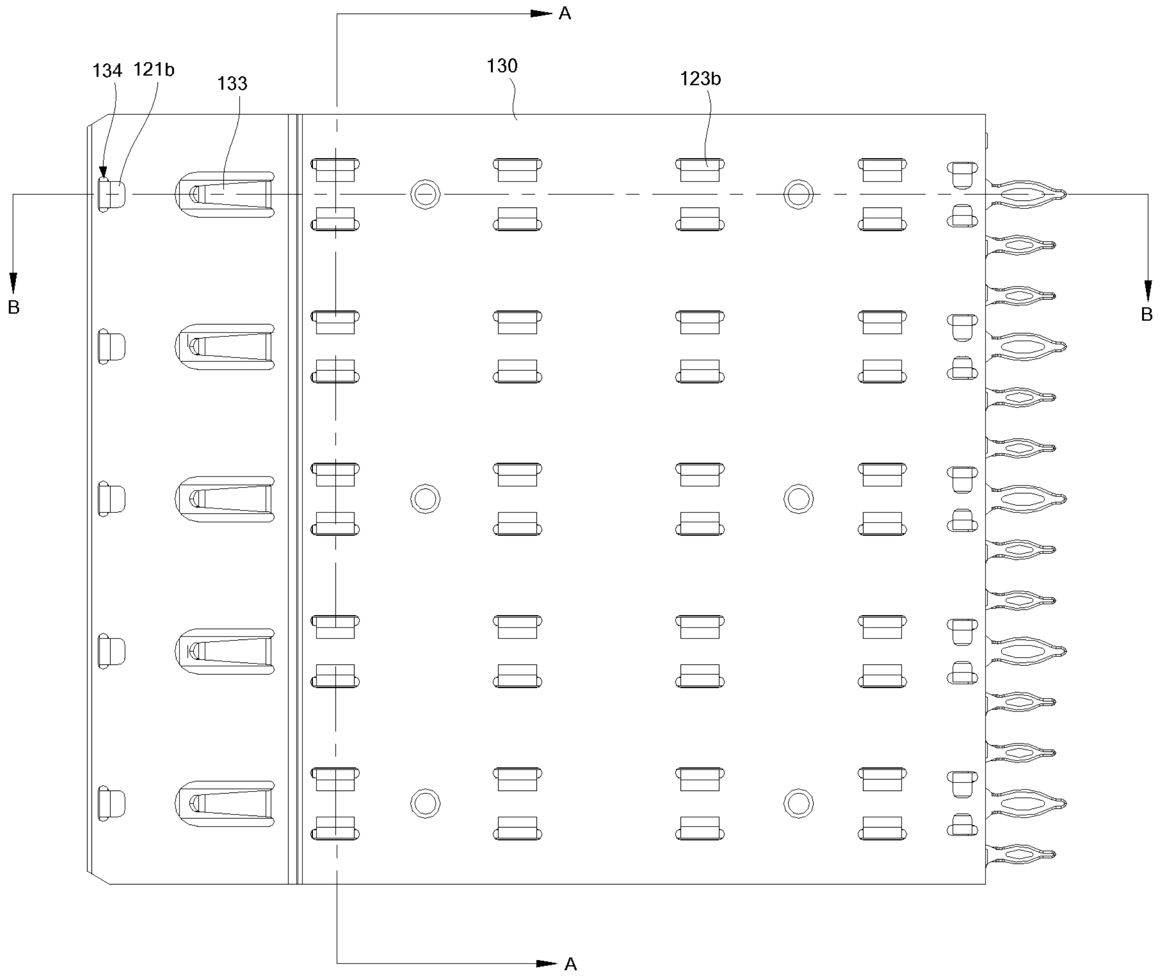
FIG. 12 is a schematic view of a first connector shown in FIG. 6 from another perspective.
Figure 13:
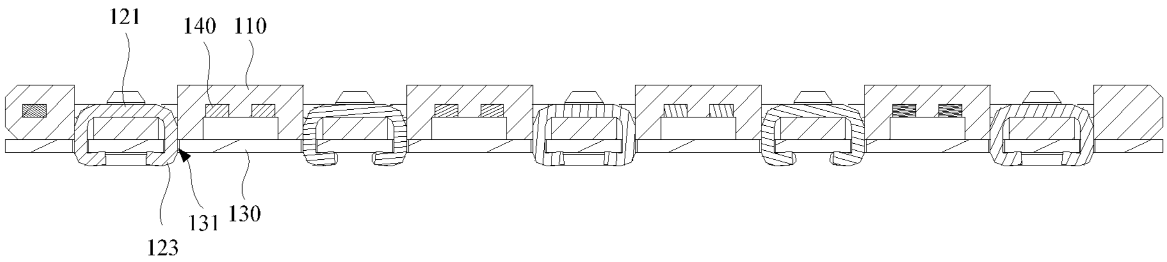
FIG. 13 is a cross-sectional view taken along a line A-A of a first connector shown in FIG. 12.

As shown in FIG. 12 and FIG. 13, in one of the embodiments, the first terminal body 121 of each first ground terminal is connected to any pair of first inserting portions 123, so as to jointly press the first substrate and the first shielding piece together, and both sides of each first signal terminal are provided with a first ground terminal, so that an area of the structure of the first ground terminal wrapping the first shielding piece is relatively large. As such, the first signal terminal, the two first ground terminals adjacent to the first signal terminal, and the first shielding piece jointly form a structure close to closed transmission. Even though the signal transmission between the first connector and the second connector is close to quasi-coaxial transmission, the closed transmission of most of the energy is implemented. Therefore, the energy loss of the signal transmission between the first connector and the second connector is relatively small, and the crosstalk of the transmission of the adjacent two pairs of differential signals is relatively small.

As shown in FIG. 10, in one of the embodiments, the first shielding piece is provided with an elastic piece 133 bent toward the first substrate. Further referring to FIG. 7, the first substrate defines a hollow hole 115, so that the dielectric material between the first ground terminal and the first shielding piece is removed. Therefore, the dielectric filler is reduced, and the impedance of the connector assembly is increased. As shown in FIG. 11, in one of the embodiments, the elastic piece extends through the hollow hole and abuts against the first terminal body, so that the elastic piece is electrically connected to the first terminal body. Since the first inserting portion is in contact with the first shielding piece, there are at least two locations at which the first shielding piece is electrically connected to the first ground terminal. Therefore, the loop inductance between the transmissions of the adjacent two pairs of differential signals is greatly reduced, and the crosstalk between the adjacent two pairs of differential signals and the resonance caused by the signal transmission are reduced. In this embodiment, the hollow hole is in communication with the first positioning groove, so that the first ground terminal is better connected to the first substrate.

In one of the embodiments, the elastic piece is disposed adjacent to a mating region in which the first terminal body abuts against the second ground terminal, and the hollow hole is defined in a region of the first substrate facing the mating region, so that the dielectric material directly below the mating region of the first terminal body and the second ground terminal is removed. Since the impedance of the mating region in which the first connector and the second connector of the conventional connector assembly are in contact with and mated with each other is relatively low and capacitive, the mating region of the connector assembly is removed to reduce the dielectric filler. Therefore, the impedance of the connector assembly is increased. In one of the embodiments, the hollow hole is defined facing the first terminal body, so that the elastic piece faces the first terminal body. Therefore, the elastic piece reliably abuts against the first terminal body. In this embodiment, the hollow hole is in communication with the first positioning groove, so that the first ground terminal is better connected to the first substrate.

As shown in FIG. 11, in one of the embodiments, the first shielding piece includes a first sub-shielding piece 130*a*, a bending portion 130*b*, and a second sub-shielding piece 130*c*. Both sides of the bending portion are connected to the first sub-shielding piece and the second sub-shielding piece, respectively, and the bending portion is located between the first sub-shielding piece and the second sub-shielding piece, so that the first sub-shielding piece and the second sub-shielding piece are separated by the bending portion. The first sub-shielding piece is disposed adjacent to a mating region in which the first terminal body abuts against the second ground terminal. In this embodiment, the first sub-shielding piece is disposed facing the mating region. In one of the embodiments, the hollow hole is defined in the mating region, so that the dielectric material directly below the mating region of the first terminal body and the second ground terminal is removed. Since the impedance of the mating region in which the first connector and the second connector of the conventional connector assembly are in contact with and mated with each other is relatively low and capacitive, the mating region of the connector assembly is removed to reduce the dielectric filler. Therefore, the impedance of the connector assembly is increased.

Figure 14:
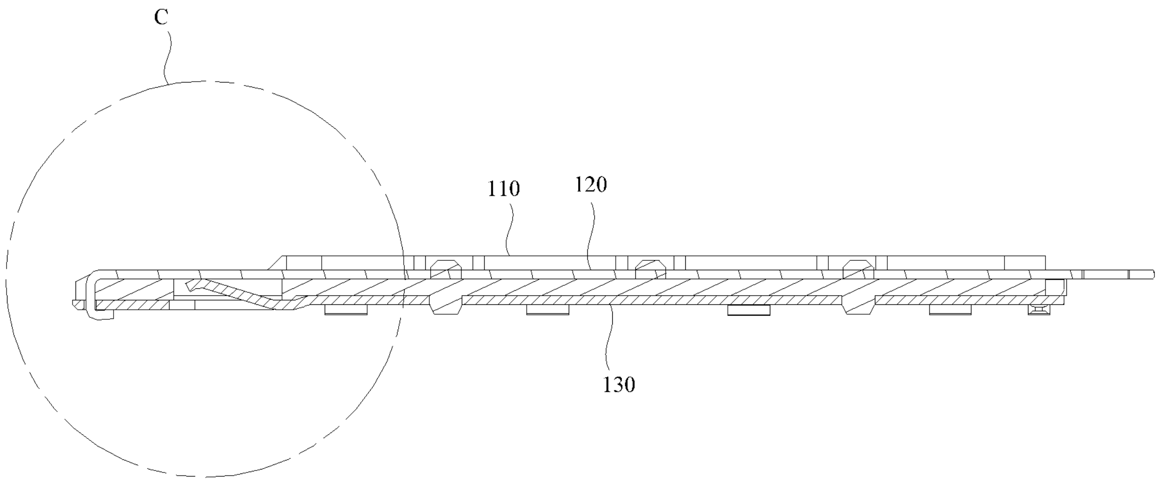
FIG. 14 is a cross-sectional view taken along a line B-B of a first connector shown in FIG. 12.
Figure 15:
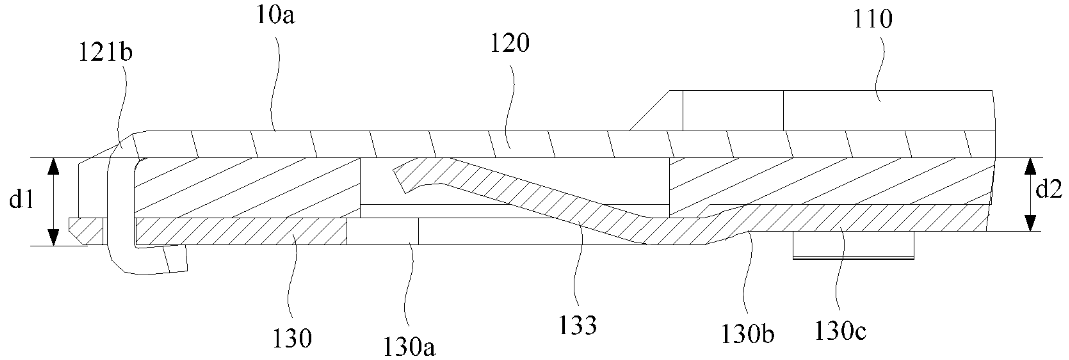
FIG. 15 is a partial enlarged view of a C part of a first connector shown in FIG. 14.

As shown in FIG. 14 and FIG. 15, in one of the embodiments, a distance d1 between the first terminal body and the first sub-shielding piece is greater than a distance d2 between the first terminal body and the second sub-shielding piece. As such, a distance between the mating region of the first terminal body and the second ground terminal and the first shielding piece is relatively large. Therefore, a distance between the first terminal body and the first shielding piece in a mating region in which the first connector is mated with the second connector is greater than a distance between a non-mating region of the first connector and the first shielding piece. In other words, a level of the first shielding piece of the first terminal body directly under the mating region of the first connector and the second connector is lower than a level of the first shielding piece directly under the non-mating region of the first connector. Therefore, the impedance of the mating region of the male and female connectors of the connector assembly is increased, and the problem that the impedance of a mating region, that is, the mating region of the male and female connectors of the conventional connector assembly is relatively low and capacitive is resolved.

As shown in FIG. 6 and FIG. 7, in one of the embodiments, a hole 116 is defined on the first substrate at a position adjacent to the mating region, so that the dielectric material at the position facing the signal of the mating region is removed, the dielectric filler is reduced, and the problem that the impedance of the mating region of the connector assembly is relatively low and capacitive is resolved. Therefore, the impedance of the connector assembly is increased. In this embodiment, the hole is located between the two first signal terminal units of the first signal terminal, so that the two first signal terminal units are spaced apart. In addition, the dielectric material under the signal in the contact region of the connector assembly is removed. Therefore, the dielectric filler is reduced. In one of the embodiments, there are a plurality of first signal terminals, and a hole is defined between two first signal terminal units of any first signal terminal. As such, a plurality of holes are defined in the contact region of the connector assembly. A first signal terminal exists between adjacent two first ground terminals, so that the transmission of adjacent two differential signals is separated, and the crosstalk between the adjacent two differential signals during transmission is avoided.

As shown in FIG. 6, in order to make each first signal terminal unit be reliably connected to the first substrate, in one of the embodiments, the first substrate defines a third positioning groove 117 in communication with the hole, and the two first signal terminal units are located in the third positioning groove and are connected to the first substrate, so that the each first signal terminal unit is reliably connected to the first substrate.

In this embodiment, the first sub-shielding piece and the second sub-shielding piece are parallel to the first substrate. The first sub-shielding piece, the bending portion, and the second sub-shielding piece are integrally formed to make the structure of the first shielding piece relatively compact. A distance between the first sub-shielding piece and the first terminal body is a third distance. A distance between the second sub-shielding piece and the first terminal body is a fourth distance. In one of the embodiments, a difference between the third distance and the fourth distance ranges from 0.05 mm to 0.5 mm. Therefore, not only the impedance of the mating region of the male and female connectors of the connector assembly is increased, but also a thickness of the first connector is relatively thin. In this embodiment, the difference between the third distance and the fourth distance is 0.25 mm.

Figure 16:
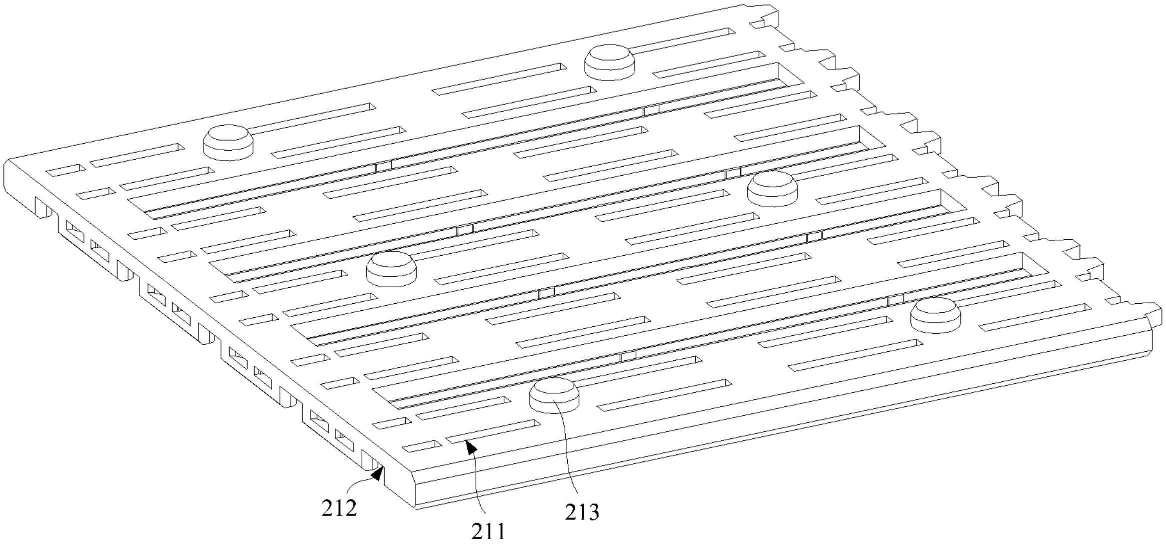
FIG. 16 is a schematic view of a second substrate of a second connector shown in FIG. 8.

As shown in FIG. 8 and FIG. 16, in one of the embodiments, the second substrate defines a second through hole 211. Further referring to FIG. 17, the second ground terminal includes a second terminal body 220*a* and a second inserting portion 220*b* connected to each other. The second terminal body and the second shielding piece are located on both sides of the second substrate, respectively, and the second inserting portion extends through the second through hole and is in contact with the second shielding piece, so that the ground signal of the second terminal body is transmitted to the second shielding piece through the second inserting portion. Therefore, the second ground terminal is electrically connected to the second shielding piece. In this embodiment, the second terminal body is located on one side of the second substrate away from the second shielding piece, so that the second terminal body is disposed separated from the second shielding piece. In addition, a distance between the second terminal body and the second shielding piece is relatively large. Therefore, the impedance of the second connector is increased.

Figure 17:
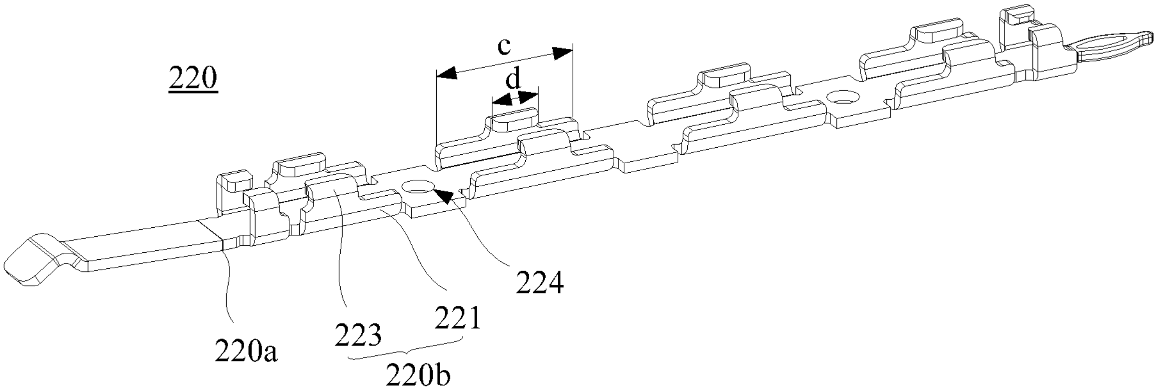
FIG. 17 is a schematic view of a second ground terminal of a second connector shown in FIG. 8.
Figure 18:
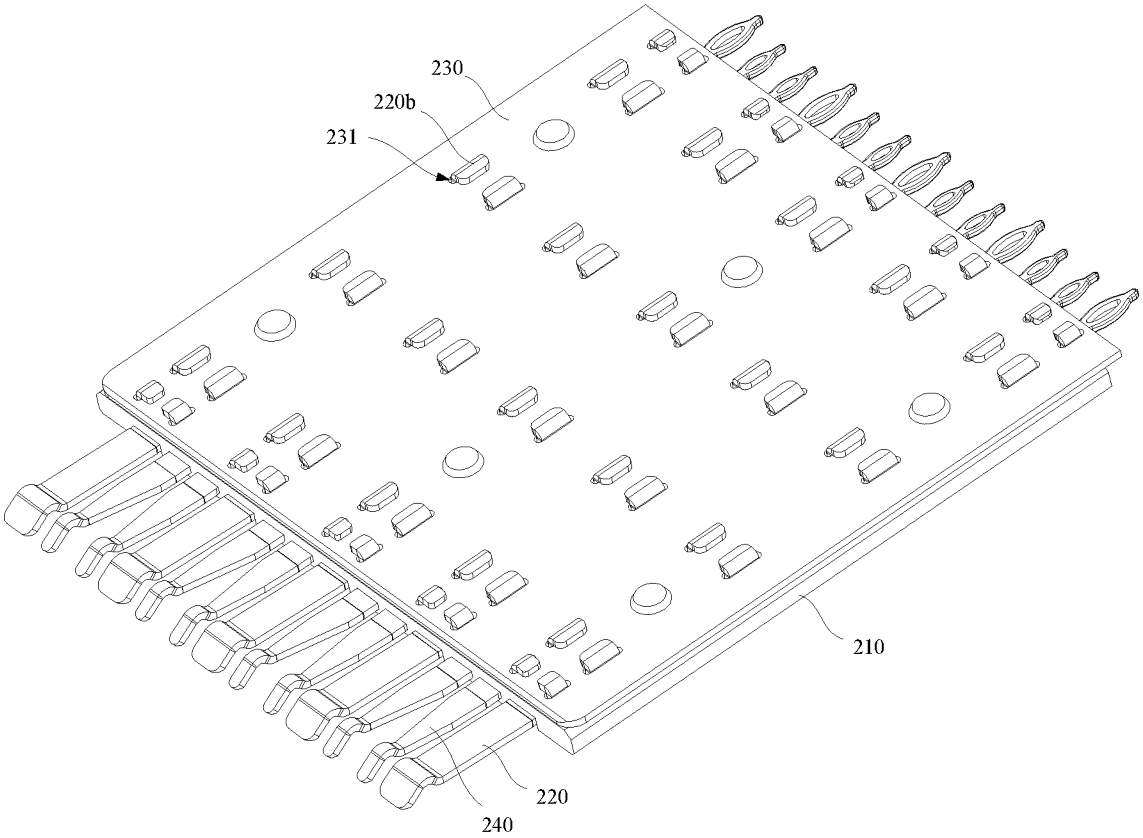
FIG. 18 is a schematic view of a second connector shown in FIG. 8 from another perspective.

Further referring to FIG. 17 and FIG. 18, in one of the embodiments, the second shielding piece defines a second connection hole 231, and the second inserting portion is partially located in the second connection hole and abuts against the second shielding piece, so that a contact area between the second inserting portion and the second shielding piece is relatively large. Therefore, the second inserting portion is electrically connected to the second shielding piece reliably.

In one of the embodiments, the second inserting portion is in a bent shape, so that the second inserting portion better abuts against the second shielding piece. In one of the embodiments, one end of the second inserting portion away from the second terminal body abuts against one side of the second shielding piece away from the second substrate. That is, the end of the second inserting portion away from the second terminal body is folded back and abuts against the side of the second shielding piece away from the second substrate, so that the second ground terminal fixes and combines the second shielding piece with the second substrate. Therefore, not only the reliability of the connection between the second shielding piece and the second substrate is improved, but also the contact area between the second inserting portion and the second shielding piece is relatively large, so that the second inserting portion is electrically connected to the second shielding piece more reliably. In this embodiment, the second inserting portion is a bent piece with an L-shaped cross-section. The second inserting portion is vertically connected to the second terminal body.

As shown in FIG. 17, in one of the embodiments, the second inserting portion includes a second connection portion 221 and a second inserting portion main body 223 connected to each other, and the second connection portion is connected to the second terminal body, so that the second inserting portion is connected to the second terminal body. In this embodiment, the second inserting portion main body is in a bent shape. In one of the embodiments, a width of the second connection portion in a direction parallel to a plane where the extending direction of the second terminal body lies is a fifth width c, a width of the second inserting portion main body in a direction parallel to the plane where the extending direction of the second terminal body lies is a sixth width d, and the fifth width is greater than the sixth width, so that the ground signal of the second terminal body can be quickly transmitted to the second inserting portion main body through the second connection portion. Therefore, the second ground terminal is better electrically connected to the second shielding piece. In one of the embodiments, a width of the second through hole in a direction parallel to the extending direction of the second terminal body is equal to the fifth width, and the second connection portion extends through the second through hole. A width of the second connection hole in a direction parallel to the extending direction of the second terminal body is equal to the sixth width, and the second inserting portion main body extends through the second connection hole, so that the second connection portion is limited to one side of the second shielding piece. Therefore, a distance between the second terminal body and the second shielding piece is relatively precise.

As shown in FIG. 8 and FIG. 17, in one of the embodiments, a side of the second substrate away from the second shielding piece defines a second positioning groove 212 in communication with the second through hole, and the second terminal body is located in the second positioning groove and is connected to the second substrate, so that the second ground terminal is connected to the second substrate. Further, a second boss 213 is formed on the side of the second substrate away from the second shielding piece, and the second boss is located in the second positioning groove. The second terminal body defines a second positioning hole 224 matching with the second boss, so as to avoid the problem that the second terminal body is loose from the second substrate, so that the second ground terminal is better positioned and connected to the second substrate. Therefore, the second ground terminal is clamped and fixed to the second substrate.

In one of the embodiments, a number of the second through hole is at least two. A number of the second inserting portion is at least two, and each second inserting portion is partially located in a corresponding second through hole, so that the connection between the second shielding piece and the second substrate is stronger, and the electrical connection between the second ground terminal and the second shielding piece is more reliable.

In one of the embodiments, a number of the second through hole and a number of the second inserting portion are both 2N. 2N second inserting portions are symmetrically distributed on both sides of an extending direction of the second terminal body, and bending directions of any two of the second inserting portions symmetrically disposed with respect to the extending direction of the first terminal body are opposite, so that the second ground terminal better fixes and combines the second shielding piece and the second substrate together. Therefore, the connection between the second shielding piece and the second substrate is stronger, and the electrical connection between the second ground terminal and the second shielding piece is more reliable. N is greater than or equal to 1, and N is an integer. In this embodiment, a plane where a bending direction of the each second inserting portion lies is a cross-section of the second terminal body. The extending direction of the second terminal body is perpendicular to the plane where the bending direction of the each second inserting portion lies. That is to say, the extending direction of the second terminal body as described herein is perpendicular to the cross-section of the second terminal body. The extending direction of the second terminal body is parallel to the extending direction of the first terminal body.

In an embodiment, two second inserting portions symmetrically disposed on the second terminal body along the extending direction of the second terminal body form a pair of second inserting portions. As such, 2N second inserting portions form N pairs of second inserting portions. Bending directions of each pair of second inserting portions are opposite, and planes where the bending directions of the each pair of second inserting portions lie are coplanar, so that the second ground terminal better fixes and combines the second shielding piece and the second substrate together. Therefore, the connection between the second shielding piece and the second substrate is stronger, and the electrical connection between the second ground terminal and the second shielding piece is more reliable.

In one of the embodiments, the first terminal body of each second ground terminal is connected to any pair of second inserting portions, so as to jointly press the second substrate and the second shielding piece together, and both sides of each second signal terminal are provided with a second ground terminal, so that an area of the structure of the second ground terminal wrapping the second shielding piece is relatively large. As such, the second signal terminal, the two second ground terminals adjacent to the second signal terminal, and the second shielding piece jointly form a structure close to closed transmission. Even though the signal transmission between the first connector and the second connector is close to quasi-coaxial transmission, the closed transmission of most of the energy is implemented. Therefore, the energy loss of the signal transmission between the first connector and the second connector is relatively small, and the crosstalk of the transmission of the adjacent two pairs of differential signals is relatively small.

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this specification.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

What is claimed is:

1. A connector assembly, comprising:

a first connector, wherein the first connector comprises a first substrate, a first ground terminal, and a first shielding piece, the first ground terminal and the first shielding piece are disposed on the first substrate, and the first ground terminal is electrically connected to the first shielding piece; and a second connector, wherein the second connector comprises a second substrate, a second ground terminal, and a second shielding piece, the second ground terminal and the second shielding piece are disposed on the second substrate, the second ground terminal is electrically connected to the second shielding piece, and when the second connector is mated with the first connector, the second ground terminal is electrically connected to the first ground terminal, wherein the first substrate defines a first through hole, the first ground terminal comprises a first terminal body and a first inserting portion connected to each other, the first terminal body and the first shielding piece located on both sides of the first substrate, respectively, the first terminal body abuts against the second ground terminal, and the first inserting portion extends through the first through hole and is in contact with the first shielding piece;

wherein one side of the first substrate away from the first shielding piece defines a first positioning groove in communication with the first through hole, and the first terminal body is located in the first positioning groove and is connected to the first substrate.

2. The connector assembly according to claim 1, wherein a first boss is formed on the side of the first substrate away from the first shielding piece, the first boss is located in the first positioning groove, and the first terminal body defines a first positioning hole matching with the first boss.

3. The connector assembly according to claim 1, wherein the first ground terminal elastically abuts against the second ground terminal.

4. The connector assembly according to claim 3, wherein an abutting elastic piece in a bent shape is formed on an end of the second ground terminal adjacent to the first ground terminal, and the abutting elastic piece abuts against the first ground terminal.

5. The connector assembly according to claim 1, wherein the first ground terminal further comprises a bending hook connected to the first terminal body, and the hook is disposed adjacent to the second ground terminal, the first shielding piece defines a via hole, the hook extends through the via hole, and an end of the hook away from the first terminal body abuts against the first shielding piece.

6. The connector assembly according to claim 5, wherein the first inserting portion comprises a first connection portion and a first inserting portion main body connected to each other, and the first connection portion is connected to the first terminal body.

7. The connector assembly according to claim 6, wherein a width of the first connection portion parallel to an extending direction of the first terminal body is a first width, a width of the first inserting portion main body parallel to the extending direction of the first terminal body is a second width, and the first width is greater than the second width.

8. The connector assembly according to claim 1, wherein the first shielding piece defines a first connection hole, and the first inserting portion is partially located in the first connection hole and abuts against the first shielding piece.

9. The connector assembly according to claim 8, wherein the first inserting portion is in a bent shape, and one end of the first inserting portion away from the first terminal body abuts against one side of the first shielding piece away from the first substrate.

10. The connector assembly according to claim 9, wherein a number of the first through holes and a number of the first inserting portions are both 2N, the 2N first inserting portions are symmetrically distributed on both sides of an extending direction of the first terminal body, each of the first inserting portions is partially located in a corresponding first through hole, and bending directions of any two of the first inserting portions symmetrically disposed with respect to the extending direction of the first terminal body are opposite; wherein N is an integer greater than or equal to 1.

11. The connector assembly according to claim 1, wherein the first shielding piece is provided with an elastic piece bent toward the first substrate, the first substrate comprises a hollow hole, and the elastic piece extends through the hollow hole and abuts against the first terminal body.

12. The connector assembly according to claim 11, wherein the elastic piece is disposed adjacent to a mating region in which the first terminal body abuts against the second ground terminal, and the hollow hole is defined in a region of the first substrate facing the mating region.

13. The connector assembly according to claim 12, wherein the hollow hole is defined facing the first terminal body.

14. A connector assembly, comprising:

first connector, wherein the first connector comprises a first substrate, a first ground terminal, and a first shielding piece, the first ground terminal and the first shielding piece are disposed on the first substrate, and the first ground terminal is electrically connected to the first shielding piece; and a second connector, wherein the second connector comprises a second substrate, a second ground terminal, and a second shielding piece, the second ground terminal and the second shielding piece are disposed on the second substrate, the second ground terminal is electrically connected to the second shielding piece, and when the second connector is mated with the first connector, the second ground terminal is electrically connected to the first ground terminal, wherein the first substrate defines a first through hole, the first ground terminal comprises a first terminal body and a first inserting portion connected to each other, the first terminal body and the first shielding piece are located on both sides of the first substrate, respectively, the first terminal body abuts against the second ground terminal, and the first inserting portion extends through the first through hole and is in contact with the first shielding piece;

wherein the first shielding piece is provided with an elastic piece bent toward the first substrate, the first substrate defines a hollow hole, and the elastic piece extends through the hollow hole and abuts against the first terminal body.

15. The connector assembly according to claim 14, wherein the first shielding piece comprises a first sub-shielding piece, a bending portion, and a second sub-shielding piece, both sides of the bending portion are connected to the first sub-shielding piece and the second sub-shielding piece, respectively, the bending portion is located between the first sub-shielding piece and the second sub-shielding piece, the first sub-shielding piece is disposed adjacent to a mating region in which the first terminal body abuts against the second ground terminal, the hollow hole is defined in the mating region, and a distance between the first terminal body and the first sub-shielding piece is greater than a distance between the first terminal body and the second sub-shielding piece.

16. The connector assembly according to claim 15, wherein a hole is defined on the first substrate at a position adjacent to the mating region.

17. A connector assembly, comprising:

a first connector, wherein the first connector comprises a first substrate, a first ground terminal, and a first shielding piece, the first ground terminal and the first shielding piece are disposed on the first substrate, and the first ground terminal is electrically connected to the first shielding piece, and a second connector, wherein the second connector comprises a second substrate, a second ground terminal, and a second shielding piece, the second ground terminal and the second shielding piece are disposed on the second substrate, the second ground terminal is electrically connected to the second shielding piece, and when the second connector is mated with the first connector, the second ground terminal is electrically connected to the first ground terminal;

wherein the second substrate defines a second through hole, the second ground terminal comprises a second terminal body and a second inserting portion connected to each other, the second terminal body and the second shielding piece are located on both sides of the second substrate, respectively, and the second inserting portion extends through the second through hole and is in contact with the second shielding piece;

wherein the second shielding piece defines a second connection hole, and the second inserting portion is partially located in the second connection hole and abuts against the second shielding piece;

the second inserting portion is in a bent shape, and one end of the second inserting portion away from the second terminal body abuts against one side of the second shielding piece away from the second substrate.

* * * * *